3,384,613
RETARDATION OF SCORCH IN RUBBER COMPOUNDS CONTAINING DICUMYL PEROXIDE AS THE VULCANIZING AGENT
Carl R. Parks, Akron, Ohio, assignor to The Goodyear Tire & Rubber Company, Akron, Ohio, a corporation of Ohio
No Drawing. Filed Aug. 20, 1964, Ser. No. 391,022
14 Claims. (Cl. 260—45.9)

This invention relates to the curing, or vulcanizing of rubber with organic peroxide curing agents. More particularly, it concerns improvements in the curing of natural or synthetic rubber with ditertiary organic peroxides, that is, peroxides having a peroxy group between a pair of tertiary carbon atoms.

The use of ditertiary peroxides such as dicumyl peroxide to cure or vulcanize rubber yields a product having excellent aging and resiliency characteristics. Nevertheless, more widespread use of peroxide cured rubber has been restricted by certain limitations.

One such limitation is the tendency of many peroxides to "scorch," or prevulcanize the rubber during milling and prior to curing. This causes the uncured rubber to harden prematurely and thereby become difficult to mill and form. Also the rubber molecules crosslink at temperatures too low for the attainment of optimum physical properties.

A second limitation is the generally high elastic modulus, or stiffness, of peroxide cured rubber. High modulus in a given rubber normally correlates with diminished ability to withstand flexing and tearing, and with lowered elongation at break.

The above limitations are commonly regarded as being inherent in peroxide cured rubber, whether natural or synthetic. Attempts to mitigate them by employing various modifiers for the peroxides have rarely been successful, chiefly because modifiers capable of reducing scorch and lowering the elastic modulus often tend to detract from the otherwise excellent aging and resiliency properties. The selection of known modifiers from related arts has proved unavailing, as indicated by the fact that certain modifiers heretofore found effective with sulfur-curing systems act as scorch accelerators in peroxide curing.

It has now been discovered, according to the invention, that the advantages of rubbers cured with ditertiary organic peroxides may be retained while their disadvantages are reduced or eliminated by incorporating in the uncured rubber and peroxide composition, a small modifying amount of a ring-substituted nitro-aryl compound, a ring-substituted nitrosoaryl compound, or an N-nitroso diaryl amine compound, or a mixture thereof. Not only do these modifiers effectively retard scorching, but they may also reduce the elastic modulus, and increase elongation relative to unmodified peroxide-cured rubber. Moreover, they preserve the aging and resiliency properties of peroxide-cured rubber.

The modifiers of the invention, to be identified more fully in a subsequent portion hereof, have the following essential structural nuclei:

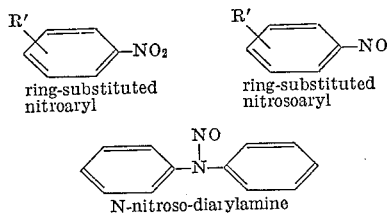

ring-substituted nitroaryl    ring-substituted nitrosoaryl

N-nitroso-diarylamine

The indicated R' substituents may be one or more hydrocarbon, substituted hydrocarbon, or non-hydrocarbon groups, advantageously disposed ortho to the nitro or nitroso group, and there may be additional substituents at other positions on the ring or rings.

The ability of these modifiers to function so uniquely and effectively in peroxide-curing is unusual even for such an empirical art as rubber vulcanization. Certain N-nitroso-diaryl compounds have long been known as scorch retardants for sulfur-vulcanizing systems (Hand et al. U.S. 2,798,860, Leeper et al. U.S. 2,930,777, Whitby, "Synthetic Rubber," Wiley 1954, p. 395). But their utility in peroxide-cured systems is contrary to the implications of Whitby at p. 395, where it is stated that scorching in active sulfur-vulcanizing systems can be retarded with benzoic acid, salicylic acid, or phathalic anhydride, as well as N-nitrosodiphenylamine. It has now been found that the first three of these retarders for sulfur curing are actually scorch accelerators in peroxide-cured systems. See Table I below, presenting the Mooney Scorch Values (corresponding to the resistance of a rubber to prevulcanization during milling) of rubbers with various sulfur curing system retarders:

TABLE I.—EFFECTS OF KNOWN "RETARDERS" ON MOONEY SCORCH VALUES OF NATURAL RUBBER TREAD STOCK CONTAINING 3 PHR.* DICUMYL PEROXIDE

| Test | "Retarder" | Conc., phr. | Mooney Scorch Value | |
|---|---|---|---|---|
| | | | d5 | d20 |
| 1 | None | | 15.3 | 27.0 |
| 2 | Salicylic Acid | 1 | 14.5 | 23.3 |
| 3 | Benzoic Acid | 1 | 12.5 | 19.0 |
| 4 | Phthalic Anhydride | 1 | 14.5 | 22.8 |

*Parts per 100 parts of rubber polymer.

Mooney Scorch Values are determined with the large-rotor Mooney viscometer at 250° F. (ASTM D–1077–55T) and represent the number of minutes for a rubber containing a curing agent to increase in viscosity by five ("d5") and then by twenty ("d20") points. The Mooney viscometer simulates conditions encountered during milling, and accordingly a high Mooney Scorch Value indicates a high resistance to prevulcanizing, or scorching.

Further to illustrate the absence of predictable relationships among the various curing systems, it has elsewhere been shown that N-nitroso diaryl compounds are ineffective in the curing of nitrile rubber with cumene hydroperoxide (Lufter, Rubber World, vol. 133, 1956, p. 511).

Rubbers which may be treated in accordance with the invention are the elastomeric organic high polymers, including natural rubber and the various synthetic rubbers which cure (i.e., vulcanize or crosslink) with ditertiary peroxides. Most commonly but not exclusively these peroxide-curable rubbers are polymers of conjugated dienes where the monomers are linked through carbon-carbon bonds. Representative examples of synthetic rubbery polymers of conjugated dienes include: polychloroprene, polyisoprene having essentially all of its units combined in a cis-1,4 structure (Mayor et al., Rubber and Plastic Age, vol. 39, No. 11, p. 938, 1958); polybutadiene having essentially all of its units combined in a cis-1,4 structure (Crouch, Rubber and Plastic Age, vol. 42, p. 276–282, March 1961); the rubbery copolymers of butadiene and styrene (SBR), which may contain from 50–90% or more of butadiene; oil extended butadiene-styrene copolymers; terpolymers of octadiene or dicyclopentadiene with ethylene and propylene; and copolymers of acrylonitrile and butadiene, the so-called nitrile rubbers. It is not essential that the peroxide-curable organic rubber be a diene polymer, or that it contain residual unsaturation, as rubbers such as polyisobutylene (Little, U.S. 2,710,291) and polypropylene rubbers are also curable with ditertiary peroxides.

More fully describing the ditertiary peroxide curing agents used herewith, these are tertiary butyl peroxide and its homologues and analogues, all having the essential structure:

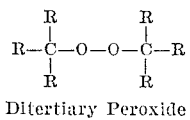

Ditertiary Peroxide

These agents all have at least one peroxy group disposed between tertiary carbon atoms, which tertiary carbon atoms are linked to carbon atoms constituting portions of each of the R groups, which groups may be alkyl (straight or branched chain, or cyclic), alkenyl, or aryl groups, or combinations of such groups. These may be further substituted by nonhydrocarbon groups, e.g. ethers, additional peroxy groups, or halogens such as chlorine, which do not deleteriously affect the curing process or the cured rubber product. The several R groups may be the same or different on each or both of the tertiary carbon atoms.

Various tetrtiary peroxides of the general formula shown above may be used in the practice of this invention. In selecting a peroxide for use in this invention the peroxide should be stable at the temperature of mixing of the rubber composition so that it can be mixed without decomposing excessively and should break down at a reasonable rate under curing conditions so that it can enter into the curing reactions. Representative examples of such peroxides are ditertiary-butyl peroxide, ditertiary-amyl peroxide, 2,2-di-(tertiary-butylperoxy) butane, di (alpha, alpha-dimethylbenzyl) peroxide (also known as dicumene or dicumyl peroxide), di (alpha, alpha-dimethyl-p-chlorobenzyl) peroxide, di (alpha, alpha-dimethyl-2, 4-dichlorobenzyl) peroxide, tertiarybutyl-1-methylcyclohexyl peroxide, and peroxides formed by the oxidation of terpene hydrocarbons such as turpentine, alphapinene, para-menthane and pinane. Of these peroxides, the dicumyl peroxide is the preferred variety.

Additional examples of ditertiary peroxides, especially those which are analogues of dicumene (or dicumyl) peroxide, are given in U.S. 2,819,256, U.S. 2,845,411, British 781,040, and U.S. 2,909,584, the disclosures of which are hereby incorporated by reference. Other ditertiary peroxides are described in the examples below.

The modifiers or scorch retardants of the invention are, as previously indicated, ring-substituted nitro or nitroso aryl compounds or N-nitroso diaryl compounds whose essential structures are those set forth earlier. For each of these classes of compounds, the aryl ring may be further substituted with hydrocarbon, substituted hydrocarbon, or non-hydrocarbon substituents that are not themselves deleterious to the process or product. Thus, one or more aromatic or alicyclic rings may be present on the essential structures, coupled for example by biphenyl or by fused configurations, and these in turn may be substituted further. Additionally, the scorch retardants may have one or more additional nitro and/or nitroso groups in the molecule, as in the case of 2,4-dinitro phenol or 1-chloro-2,4-dinitrobenzene. Indeed, for the ortho-substituted nitro or nitroso aryl compounds it is preferred that these be a second nitro or nitroso group respectively, meta to the first.

For the nitro or nitroso aryl compounds, it is advantageous that the essential ring substituent R' be a non-hydrocarbon group such as, for example, hydroxyl, chloro, bromo, nitro, fluoro, mercaptyl, etc. Alternatively, it may be a hydrocarbon group or a substituted hydrocarbon group, typified by methyl, chloromethyl, benzyl, etc. It is preferred that the essential group be ortho to a nitro or nitroso group, but meta or para structures are also effective.

Should the modifier be or contain an N-nitroso diarylamine, reference may be directed to such references as U.S. 2,095,921, U.S. 2,798,860, and U.S. 2,930,777 for their preparation and for illustrative examples. Although the unsubstituted N-nitrosodiphenylamine is perfectly satisfactory, its substituted analogues (see U.S. 2,930,777) are effective alternatives. Such analogues are derivatives of the essential nucleus depicted earlier, but with one or more hydrocarbon, non-hydrocarbon, or substituted hydrocarbon substituents on either or both rings.

The invention in its various aspects is further described in the following examples, which depict representative variables. It will be understood that these are illustrative only, and are not intended to be wholly definitive with respect to scope or conditions.

Example I

In this example, a natural rubber tread stock is compounded with high abrasion furnace black, phenyl-beta-naphthylamine antioxidant, dicumyl peroxide curing agent, and N-nitrosodiphenylamine scorch retardant. In Tests 13 through 16, magnesium oxide is added further to enhance the ultimate properties of the vulcanizate.

The Mooney Scorch Values are determined by the method of ASTM D–1077–55T, "Standards on Rubber Products," 1958, p. 600; see also Shearer et al. Rubber Chem. and Tech., 21, 1948, p. 496. According to this method, the Mooney viscosity of a curable rubber composition is determined over a period of time with the Mooney viscometer at 250° F. using the large rotor (unless otherwise stated), and the viscosity-time relationship is plotted on a graph. The Scorch Values are the number of minutes needed for the composition to increase in viscosity by five points ("d5") and then by twenty points ("d20") above the minimum viscosity.

Tensile and elongation determinations are according to the method of ASTM D–638–46T.

The following results are obtained:

TABLE II.—NATURAL RUBBER TREAD STOCK

| Test | 5 | 6 | 7 | 8 | 9 | 10 | 11 | 12 | 13 | 14 | 15 | 16 |
|---|---|---|---|---|---|---|---|---|---|---|---|---|
| (a) Compounding: | | | | | | | | | | | | |
| Smoked sheet, parts by weight | 100 | 100 | 100 | 100 | 100 | 100 | 100 | 100 | 100 | 100 | 100 | 100 |
| High abrasion furnace black | 50 | 50 | 50 | 50 | 50 | 50 | 50 | 50 | 50 | 50 | 50 | 50 |
| Phenyl-beta-naphthylamine | 1.25 | 1.25 | 1.25 | 1.25 | 1.25 | 1.25 | 1.25 | 1.25 | 1.25 | 1.25 | 1.25 | 1.25 |
| Dicumyl peroxide | 2 | 2 | 2 | 2 | 3 | 3 | 3 | 2 | 2 | 2 | 2 | 2 |
| N-nitrosodiphenylamine | 0 | 0.25 | 0.50 | 1.0 | 0 | 0.50 | 1.0 | 0 | 0.25 | 0.50 | 1.0 | 2.0 |
| Magnesium oxide | | | | | | | | | 2 | 2 | 2 | 2 | 2 |
| (b) Mooney Scorch Value (Minutes): | | | | | | | | | | | | |
| d5 | 17 | 31 | 51 | 89 | 13 | 41 | 71 | 13 | 22 | 29 | 30 | 34 |
| d20 | 29 | 47 | 69 | 105 | 21 | 50 | 80 | 18 | 30 | 50 | 65 | 92 |
| (c) Property: | | | | | | | | | | | | |
| Modulus, p.s.i.g. (300% Elong.): | | | | | | | | | | | | |
| Cure at 300° F.: | | | | | | | | | | | | |
| 50 min | 2,580 | | | 1,980 | | | | 2,900 | 2,830 | 2,440 | 2,150 | 1,850 |
| 80 min | 2,860 | | | 2,100 | | | | 3,180 | 3,100 | 2,670 | 2,380 | 2,090 |
| 120 min | 2,980 | | | 2,170 | | | | | 3,120 | 2,710 | 2,430 | 2,160 |
| Ultimate Elongation, percent: | | | | | | | | | | | | |
| Cure at 300° F.: | | | | | | | | | | | | |
| 50 min | 335 | | | 380 | | | | 330 | 355 | 380 | 405 | 385 |
| 80 min | 315 | | | 370 | | | | 290 | 325 | 345 | 375 | 365 |
| 120 min | 315 | | | 365 | | | | 280 | 310 | 350 | 360 | 370 |
| Tensile, p.s.i.g.: | | | | | | | | | | | | |
| Cure at 300° F.: | | | | | | | | | | | | |
| 50 min | 2,980 | | | 2,740 | | | | 3,280 | 3,430 | 3,330 | 3,200 | 2,550 |
| 80 min | 3,040 | | | 2,820 | | | | 3,180 | 3,370 | 3,250 | 3,190 | 2,720 |
| 120 min | 3,130 | | | 2,900 | | | | 3,020 | 3,240 | 3,350 | 3,100 | 2,800 |

Example II

This example illustrates the preparation of a cured vulcanizate of butadiene-styrene copolymer rubber where the copolymer is composed of 77 weight percent butadiene and 23 weight percent styrene. Dicumyl peroxide and N-nitrosodiphenylamine are the peroxide curing agent and the nitrosoamine scorch retardant, respectively.

The following results are obtained:

TABLE III.—SBR TREAD STOCK

| Test | 17 | 18 | 19 | 20 |
|---|---|---|---|---|
| (a) Compounding: | | | | |
| Butadiene-Styrene rubber, parts by weight | 100 | 100 | 100 | 100 |
| High abrasion furnace black | 50 | 50 | 50 | 50 |
| Dicumyl peroxide | 2 | 2 | 2 | 1 |
| N-nitrosodiphenylamine | 0 | 1 | 0 | 1 |
| (b) Mooney Scorch Value (minutes): | | | | |
| d5 | 17 | 48 | 24 | 92 |
| d20 | 28 | >80 | 38 | |

Example III

This example illustrates the compounding of nitrile rubber with dicumyl peroxide, using N-nitrosodiphenylamine as the scorch retardant.

The Mooney Scorch Value for the tests of the example are determined with the small rotor.

The following data are obtained:

TABLE IV.—NITRILE RUBBER

| Test | 21 | 22 | 23 | 24 |
|---|---|---|---|---|
| (a) Compounding: | | | | |
| Butadiene-Acrylonitrile rubber, parts by weight | 100 | 100 | 100 | 100 |
| Dicumyl peroxide | 2 | 2 | 1 | 1 |
| N-nitrosodiphenylamine | 0 | 1 | 0 | 1 |
| (b) Mooney Scorch Value (minutes): | | | | |
| d5 | 16 | >60 | 35 | >90 |
| d20 | 41 | >60 | 77 | >90 |

Example IV

This example illustrates a dicumyl peroxide-cured natural rubber gum stock, using N-nitrosodiphenylamine as the retardant.

The following data are obtained:

TABLE V.—NATURAL RUBBER GUM STOCK

| Test | 25 | 26 |
|---|---|---|
| (a) Compounding: | | |
| Natural rubber, parts by weight | 100 | 100 |
| Dicumyl peroxide | 2 | 2 |
| N-nitrosodiphenylamine | 0 | 1 |
| (b) Mooney Scorch Value (minutes): | | |
| d5 | 25 | >60 |
| d20 | 40 | >60 |

Example V

In this example, a natural rubber white stock is compounded with dicumyl peroxide, using N-nitrosodiphenylamine as the scorch retardant.

The results shown in Table VI below illustrate the ability of nitrosoamines to retard scorch in white rubber. However, because nitrosoamines tend to discolor rubber, they are not recommended for white rubber stocks.

TABLE VI.—NATURAL RUBBER WHITE STOCK

| Test | 27 | 28 |
|---|---|---|
| (a) Compounding: | | |
| Natural rubber, parts by weight | 100 | 100 |
| $TiO_2$ | 30 | 30 |
| $CaCO_3$ | 25 | 25 |
| ZnO | 15 | 15 |
| 2,2′methylene bis-2-tertiary butyl-4 methyl phenol (antioxidant) | 1.25 | 1.25 |
| Dicumyl peroxide | 2 | 2 |
| N-nitrosodiphenylamine | 0 | 1 |
| (b) Mooney Scorch Value (minutes): | | |
| d5 | 33 | >59 |
| d20 | 50 | >60 |

Example VI

This example illustrates the scorch retarding of N-nitrosodiphenylamine when used with $\alpha, \alpha, \alpha', \alpha'$-tetramethyl-p-phenylene dimethylene-bis(tert. butyl peroxide), (supplied by Montecatini as "Peroximon") in a natural rubber tread stock.

TABLE VII.—NATURAL RUBBER TREAD STOCK

| Test | 29 | 30 |
|---|---|---|
| (a) Compounding: | | |
| Natural rubber, parts by weight | 100 | 100 |
| High abrasion furnace black | 50 | 50 |
| Peroximon (35%) | 12 | 12 |
| N-nitrosodiphenylamine | 0 | 1.0 |
| (b) Mooney Scorch Value (minutes): | | |
| d5 | 7 | 49 |
| d20 | 13 | 57 |

Example VII

This example illustrates the scorch retarding of N-nitrosodiphenylamine when used with "Luperco 230XL" (a proprietary peroxide sold by Lupersol, Wallace and Tiernan, Inc.) in a natural rubber tread stock.

TABLE VIII.—NATURAL RUBBER TREAD STOCK

| Test | 31 | 32 |
|---|---|---|
| (a) Compounding: | | |
| Natural rubber, parts by weight | 100 | 100 |
| High abrasion furnace black | 50 | 50 |
| Luperco 230 XL (50%) | 6.0 | 6.0 |
| N-nitroso diphenylamine | 0 | 1.0 |
| (b) Mooney Scorch Value (minutes): | | |
| d5 | 7 | 18 |
| d20 | 11 | 28 |

Example VIII

In this example, various modifiers or scorch retardants are evaluated in a dicumyl-peroxide cured natural rubber tread stock of the following composite:

TABLE IX

Compounding:
- Smoked sheet, parts by weight _____ 100
- High abrasion furnace black _____ 50
- Phenyl-beta-naphthylamine _____ 1.25
- Dicumyl peroxide _____ 3
- Modifier _____ 1

The following Mooney Scorch Values are obtained:

TABLE X

| Modifier | Mooney Scorch Value | |
|---|---|---|
| | d5 | d20 |
| None | 13 | 21 |
| N-nitrosodiphenylamine | 71 | 80 |
| 2,4-dinitrophenol | 30 | 61 |
| 1-chloro-2,4-dinitrobenzene | 31 | 63 |
| 1-nitroso-2-naphthol | 56 | 92 |

The invention is illustrated in the above-described experiments with respect to the use of from one to three parts of peroxide per 100 parts by weight of rubber. However, more or less of the peroxide can be used as desired, from 0.5 to 5.0 parts by weight of the peroxide per 100 parts by weight of rubber generally being satisfactory. The preferred range is from 1.0 to 3.0 parts by weight of the peroxide per 100 parts by weight of rubber.

The amount of scorch retardant may similarly be varied to conform with the compounding of ingredients and with the desired properties of the vulcanized rubber. Since the retardant effectiveness varies, the optimum concentration will also depend on the particular retardant selected. However, concentrations within the range of about 0.1 to about 5 parts by weight of the retardant per 100 parts by weight of rubber will usually embrace the most effective range of concentrations, with a preferred range being from about 0.5 to about 1.0 parts per 100 of rubber polymer.

Thus, it is apparent that there has been provided, according to the invention, an outstanding peroxide curing system for curing or vulcanizing a wide variety of natural and synthetic rubbers. By employing as modifiers the scorch retardants of the present invention, peroxide-curable rubbers are now available which combine the traditionally good aging and resilience of peroxide-cured rubbers with outstanding scorch resistance—often having a Mooney Scorch Value greater than three times that of the untreated rubber-peroxide vulcanized composition. Further, the rubber has a reduced modulus of elasticity, with corresponding higher elongation. The tear and flex properties are likewise improved.

Accordingly, rubbers prepared according to the invention have exceptional value in severe services. They may be used in vehicle tires, electrical insulation, and generally wherever an age-resistant, resilient, flexible, and extensible elastomer is required. As an additional benefit, residue of the retardant which remains after curing contributes materially toward aging resistance of the products.

While the invention has been described in conjunction with specific embodiments thereof, these are for illustrative purposes only, and various alternatives, modifications, and variations will be apparent to those skilled in the art in the light of the above description. It is therefore intended to embrace all such alternatives, modifications, and variations as fall within the spirit and broad scope of the appended claims.

I claim as my invention:

1. In a curable rubber composition comprising (a) a peroxide-curable rubber, said rubber being an elastomeric high polymer comprising conjugated diene monomers linked through carbon-carbon bonds, and (b) a ditertiary organic peroxide curing agent in an amount within the range of from about 0.5 to 5.0 parts by weight per 100 parts by weight of rubber, said amount being sufficient to cure said rubber, the improvement comprising (c) a modifier selected from ring-substituted nitro-aryl compounds, ring-substituted nitroso-aryl compounds, and N-nitroso diarylamine compounds, in an amount within the range of about 0.1 to about 5 parts by weight per 100 parts by weight of rubber, said amount being sufficient to retard scorching of said rubber.

2. Composition of claim 1 wherein said rubber is natural rubber.

3. Composition of claim 1 wherein said rubber is butadiene-styrene copolymer.

4. Composition of claim 1 wherein said rubber is nitrile rubber.

5. Composition of claim 1 wherein said peroxide is dicumyl peroxide.

6. Composition of claim 1 wherein said modifier is an ortho-substituted nitroaryl compound.

7. Composition of claim 6 wherein said compound is 2,4-dinitrophenol.

8. Composition of claim 6 wherein said compound is 1-chloro-2,4-dinitrobenzene.

9. Composition of claim 1 wherein said modifier is an ortho-substituted nitroso-aryl compound.

10. Composition of claim 9 wherein said compound is 1-nitroso-2-naphthol.

11. Composition of claim 1 wherein said modifier is N-nitroso diarylamine compound.

12. Composition of claim 11 wherein said compound is an N-nitrosodiphenylamine.

13. A vehicle tire comprising the cured rubber composition of claim 1.

14. A cured rubber composition prepared by curing the composition of claim 1.

References Cited

UNITED STATES PATENTS

| | | | |
|---|---|---|---|
| 3,039,989 | 5/1962 | Eastman | 260—45.9 |
| 1,869,657 | 8/1932 | Bowers | 260—45.9 |
| 2,035,698 | 3/1936 | Fisher | 260—45.9 |
| 2,897,177 | 7/1959 | Tung | 260—45.9 |
| 2,931,785 | 4/1960 | Beaver et al. | 260—45.9 |
| 2,943,075 | 6/1960 | Schweltzer | 260—45.9 |
| 3,265,672 | 8/1966 | Pariser et al. | 260—45.9 |

FOREIGN PATENTS 645,431   7/1962   Canada.

DONALD E. CZAJA, Primary Examiner.

H. E. TAYLOR, Assistant Examiner.

UNITED STATES PATENT OFFICE
CERTIFICATE OF CORRECTION

Patent No. 3,384,613                                         May 21, 1968

Carl R. Parks

It is certified that error appears in the above identified patent and that said Letters Patent are hereby corrected as shown below:

Column 5, Table III, fourth column, line 3 thereof, "2" should read -- 1 --.

Signed and sealed this 24th day of March 1970.

(SEAL)
Attest:

Edward M. Fletcher, Jr.                    WILLIAM E. SCHUYLER, JR.
Attesting Officer                              Commissioner of Patents